United States Patent
Buck et al.

(10) Patent No.: US 9,858,368 B2
(45) Date of Patent: Jan. 2, 2018

(54) INTEGRATING MANUFACTURING FEEDBACK INTO INTEGRATED CIRCUIT STRUCTURE DESIGN

(75) Inventors: Nathan C. Buck, Underhill, VT (US); Brian M. Dreibelbis, Underhill, VT (US); John P. Dubuque, Jericho, VT (US); Eric A. Foreman, Fairfax, VT (US); Peter A. Habitz, Hinesburg, VT (US); Jeffrey G. Hemmett, St. George, VT (US); Natesan Venkateswaran, Hopewell Junction, NY (US); Chandramouli Visweswariah, Croton-on-Hudson, NY (US); Xiaoyue Wang, Kanata (CA); Vladmimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 13/182,108

(22) Filed: Jul. 13, 2011

(65) Prior Publication Data

US 2013/0018617 A1    Jan. 17, 2013

(51) Int. Cl.
*G06F 17/50*      (2006.01)

(52) U.S. Cl.
CPC ...... *G06F 17/5036* (2013.01); *G06F 2217/84* (2013.01)

(58) Field of Classification Search
CPC ............. G06F 17/5031; G06F 2217/84; G06F 2217/12; G06F 17/5009; G06F 17/50; G06F 17/5036; G01R 31/2851

(Continued)

(56) References Cited

U.S. PATENT DOCUMENTS

| 4,924,430 A | 5/1990 | Zasio et al. |
| 5,218,551 A * | 6/1993 | Agrawal et al. ............. 716/113 |

(Continued)

FOREIGN PATENT DOCUMENTS

| JP | 2008034537 A | 2/2008 |
| JP | 2010122832 A | 6/2010 |

OTHER PUBLICATIONS

Manidip Sengupta et al., Application-Specific Worst Case Corners Using Response Surfaces and Statistical Models, Sep. 9, 2005, IEEE, vol. 24, 1372-1380.*

(Continued)

*Primary Examiner* — Bryan Bui
(74) *Attorney, Agent, or Firm* — Steven J. Meyers; Hoffman Warnick LLC (57) ABSTRACT

Solutions for integrating manufacturing feedback into an integrated circuit design are disclosed. In one embodiment, a computer-implemented method is disclosed including: defining an acceptable yield requirement for a first integrated circuit product; obtaining manufacturing data about the first integrated circuit product; performing a regression analysis on data representing paths in the first integrated circuit product to define a plurality of parameter settings based upon the acceptable yield requirement and the manufacturing data; determining a projection corner associated with the parameter settings for satisfying the acceptable yield requirement; and modifying a design of a second integrated circuit product based upon the projection corner and the plurality of parameter settings.

14 Claims, 9 Drawing Sheets

(58) Field of Classification Search
  USPC .............................. 702/81, 84, 179; 438/143
  See application file for complete search history.

(56) References Cited

U.S. PATENT DOCUMENTS

| | | | |
|---|---|---|---|
| 5,526,293 | A | 6/1996 | Mozumder et al. |
| 5,661,669 | A | 8/1997 | Mozumder et al. |
| 6,219,813 | B1 | 4/2001 | Bishop et al. |
| 7,428,716 | B2 | 9/2008 | Visweswariah |
| 7,487,475 | B1 | 2/2009 | Kriplani et al. |
| 7,512,919 | B2 | 3/2009 | Visweswariah |
| 8,407,630 | B1 * | 3/2013 | Chan et al. ..................... 716/54 |
| 2004/0122642 | A1 | 6/2004 | Scheffer |
| 2006/0248518 | A1 * | 11/2006 | Kundert ........................ 717/140 |
| 2008/0140330 | A1 * | 6/2008 | Morioka et al. ................ 702/81 |
| 2008/0270953 | A1 * | 10/2008 | Foreman ............ G06F 17/5031 716/113 |
| 2009/0031261 | A1 | 1/2009 | Smith et al. |
| 2010/0083200 | A1 | 4/2010 | Song et al. |
| 2010/0180243 | A1 | 7/2010 | Sinha et al. |
| 2011/0055793 | A1 | 3/2011 | Buck et al. |
| 2011/0191055 | A1 * | 8/2011 | Martinez et al. ............. 702/117 |

OTHER PUBLICATIONS

Harish et al., "On a Generalized Framework for Modeling the Effects of Process Variations on Circuit Delay Performance Using Response Surface Methodology", IEEE Transactions on Computer-Aided Design of Integrated Circuits and Systems, vol. 26, No. 3, Mar. 2007.

* cited by examiner

INTEGRATING MANUFACTURING FEEDBACK INTO INTEGRATED CIRCUIT STRUCTURE DESIGN

BACKGROUND

The subject matter disclosed herein relates to solutions for integrating manufacturing feedback into integrated circuit structure designs. More specifically, aspects of the invention provide for improving the timing closure of a subsequent integrated circuit design by using manufacturing feedback (e.g., parameter settings and a regression analysis) from an initial integrated circuit design.

Modern integrated circuits (ICs) exhibit large amounts of variability in their performance, due in part, to variations in manufacturing processes and environmental parameters. The ranges of these variations defines a process space, and at differing points in the process space differing timing paths may be critical. Static timing analysis (STA) is one approach used to analyze, debug, and validate the time performance of an integrated circuit chip during the design phase and in advance of actual fabrication. The timing of the chip is simulated to determine if it meets the timing constraints to achieve timing closure and, therefore, is likely to operate properly if fabricated in accordance with the tested design.

A conventional method for determining the performance of circuitry on an integrated circuit chip (e.g., an application specific integrated circuit, or ASIC chip), after fabrication of the wafer, is through the use of a Performance Scan-Ring Oscillator (PSRO), or PSRO circuit. A PSRO circuit acts as a free-running ring of memory elements passing a pulse, the output of which can be measured at a reserved chip output pin. "Free-running" implies a circuit that is not clocked externally, and will run as fast as the signals can propagate through the logic of the circuit, i.e., limited only by the capabilities of the technology and manufacturing process variations. The periodicity of the PSRO circuit output provides a relative indication of the circuit speed, i.e., short period means faster circuit speed. PSROs are used to gauge the quality of the fabrication process, determine the speed of the circuitry on various parts of the wafer, and thereby grade the performance of individual chips on the wafer, before and after dicing. There may be more than one PSRO on a large ASIC in order to account for process variation within the chip.

However, the PSRO approach has some general shortcomings. For example, the PSRO approach leads to developing required coverage constraints that are larger than necessary to form the desired chip feature. In particular, the PSRO approach may be insufficient in the worst-corner (WC) timing limit scenario. A corner refers to a set of process parameters/environmental conditions (or simply, parameters) that cause variations in the static timing analysis of an integrated circuit. Corners may include, for example, a "best case" corner that provides the fastest path delay between two particular nodes in a circuit path, or "worst case" corner that provides the slowest path delay between two particular nodes in a circuit path. Where the worst-corner (WC) or worst-case timing limit is concerned, the conventional PSRO approach may lead to an inaccurate WC timing limit due to the larger-than necessary required coverage constraints.

BRIEF SUMMARY

Solutions for integrating manufacturing feedback into an integrated circuit design are disclosed. In one embodiment, a computer-implemented method is disclosed including: defining an acceptable yield requirement for a first integrated circuit product; obtaining manufacturing data about the first integrated circuit product; performing a regression analysis on data representing paths in the first integrated circuit product to define a plurality of parameter settings based upon the acceptable yield requirement and the manufacturing data; determining a projection corner associated with the parameter settings for satisfying the acceptable yield requirement; and modifying the design of a second integrated circuit product based upon the projection corner and the plurality of parameter settings.

A first aspect of the invention includes a computer-implemented method including the following processes: defining an acceptable yield requirement for a first integrated circuit product; obtaining manufacturing data about the first integrated circuit product; performing a regression analysis on data representing paths in the first integrated circuit product to define a plurality of parameter settings based upon the acceptable yield requirement and the manufacturing data; determining a projection corner associated with the parameter settings for satisfying the acceptable yield requirement; and modifying a design of a second integrated circuit product based upon the projection corner and the plurality of parameter settings.

A second aspect of the invention includes a system comprising: at least one computing device configured to integrate manufacturing feedback into an integrated circuit design by performing actions including: defining an acceptable yield requirement for a first integrated circuit product; obtaining manufacturing data about the first integrated circuit product; performing a regression analysis on data representing paths in the first integrated circuit product to define a plurality of parameter settings based upon the acceptable yield requirement and the manufacturing data; determining a projection corner associated with the parameter settings for satisfying the acceptable yield requirement; and modifying a design of a second integrated circuit product based upon the projection corner and the plurality of parameter settings.

A third aspect of the invention includes a computer program having program code embodied in at least one computer-readable storage medium, which when executed, enables a computer system to integrate manufacturing feedback into an integrated circuit design by performing actions comprising: defining an acceptable yield requirement for a first integrated circuit product; obtaining manufacturing data about the first integrated circuit product; performing a regression analysis on data representing paths in the first integrated circuit product to define a plurality of parameter settings based upon the acceptable yield requirement and the manufacturing data; determining a projection corner associated with the parameter settings for satisfying the acceptable yield requirement; and modifying a design of a second integrated circuit product based upon the projection corner and the plurality of parameter settings.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

The subject matter disclosed herein relates to solutions for integrating manufacturing feedback into integrated circuit structure designs. More specifically, aspects of the invention provide for improving the timing closure of a subsequent integrated circuit design by using manufacturing feedback (e.g., parameter settings and a regression analysis) from an initial integrated circuit design.

As noted herein, static timing analysis (STA) is used to analyze, debug, and validate the time performance of a chip during the design phase and in advance of actual fabrication. The timing of the chip is simulated to determine if it meets the timing constraints to achieve timing closure and, therefore, is likely to operate properly if fabricated in accordance with the tested design.

A conventional method for determining the performance of circuitry on an integrated circuit chip (e.g., an application specific integrated circuit, or ASIC chip), after fabrication of the wafer, is through the use of a Performance Scan-Ring Oscillator (PSRO). A PSRO circuit acts as a free-running ring of memory elements passing a pulse, the output of which can be measured at a reserved chip output pin. "Free-running" implies a circuit that is not clocked externally, and will run as fast as the signals can propagate through the logic, i.e., limited only by the capabilities of the technology and manufacturing process variations. The periodicity of the PSRO output provides a relative indication of the circuit speed, i.e., short period means faster circuit speed. PSROs are used to gauge the quality of the fabrication process, determine the speed of the circuitry on various parts of the wafer, and thereby grade the performance of individual chips on the wafer, before and after dicing. There may be more than one PSRO on a large ASIC in order to account for process variation within the chip.

However, the PSRO approach has some general shortcomings. For example, the PSRO approach leads to developing required coverage constraints that are larger than necessary to form the desired chip feature. In particular, the PSRO approach may be insufficient in the worst-corner (WC) timing limit scenario. A corner refers to a set of process parameters/environmental conditions (or simply, parameters) that cause variations in the static timing analysis of an integrated circuit. Corners may include, for example, a "best case" corner that provides the fastest path delay between two particular nodes in a circuit path, or "worst case" corner that provides the slowest path delay between two particular nodes in a circuit path. Where the worst-corner (WC), or worst-case timing limit is concerned, the conventional PSRO approach may lead to an inaccurate WC timing limit due to the larger-than necessary required coverage constraints.

In contrast to conventional PSRO-based approaches, aspects of the invention include to following processes:

A) Define an acceptable yield requirement for an integrated circuit product (e.g., a chip) within a given satisfaction percentage (e.g., 95-97 percent of chips with this requirement meet test conditions). This acceptable yield requirement may be based both on the percentage of products (e.g., chips) within a batch that meet the requirement. The acceptable yield requirement may further be based upon the value (e.g., monetary cost v. processing required) of a particular yield. That is, this acceptable yield may be at least partially based upon the costs of production of the IC products (e.g., chips) when compared with the percentage that may fail to meet test conditions;

B) Obtain manufacturing data about the integrated circuit product. This may include obtaining part analysis data and/or PSRO data about components in the integrated circuit product (e.g., a manufactured chip); and C) Perform a regression analysis on data representing paths in the first integrated circuit product to define parameter settings which meet these yield requirements, using the manufacturing data. This may include performing timing (delay) measurement on all of the different logical paths on the chip, and providing distribution data regarding each of those timing measurements for the different paths. Further, the regression analysis may include performing a Shmoo test of each path within the chip. The Shmoo test, as is known in the art, is a graphical analysis of the actual response of a component (e.g., an integrated circuit chip) or system varying over a range of conditions and inputs. For example, when testing an integrated circuit memory chip, voltages, temperature and refresh rates could be varied over specified ranges (where those ranges allow the chip to function as designed). The regression analysis may be performed using both PSRO and statistical process monitor (SPM) design data. The regression analysis may generate all desired parameter distributions for the chip, which enables a subsequent statistical yield analysis on those parameter distributions. In some cases, the parameter range is defined according to the yield requirements.

The desired parameter distributions, and the subsequently determined yield requirements, will allow for effective timing closure in a later (or, subsequently) formed integrated circuit. As such, the manufacturing feedback from a first chip (e.g., Chip A), may be used in improving the manufacturing of a second chip (e.g., Chip B).

One benefit of this approach is that the modification of the design for a subsequent chip need not be implemented through a re-characterization of the chip model. That is, the fundamental SPICE (simulation program with integrated circuit emphasis) model need not be modified according to this approach. This may allow the SPICE model to be applied in different fabrication facilities, where only minor tuning is involved to meet the specific needs of each distinct fabrication facility.

Additionally, a general benefit of aspects disclosed herein over the conventional approaches that manufacturing feedback can help to provide a more robust production model for subsequently manufactured chips. Even further, as integrated circuit technology advances (e.g., from 32 nm node to 22 nm node, etc.), aspects of the invention provide detailed feedback to manufacturing facilities for adjusting to those advances. These benefits can also be gleaned from work with older (e.g., several year-old) technologies, where manufacturing facilities are able to more accurately control their processes (e.g., precision and variances in fabrication). That is, aspects of the disclosure can improve the timing rules used in manufacturing the chip, while the sensitivities of the manufacturing process can remain relatively steady.

Figure 1:
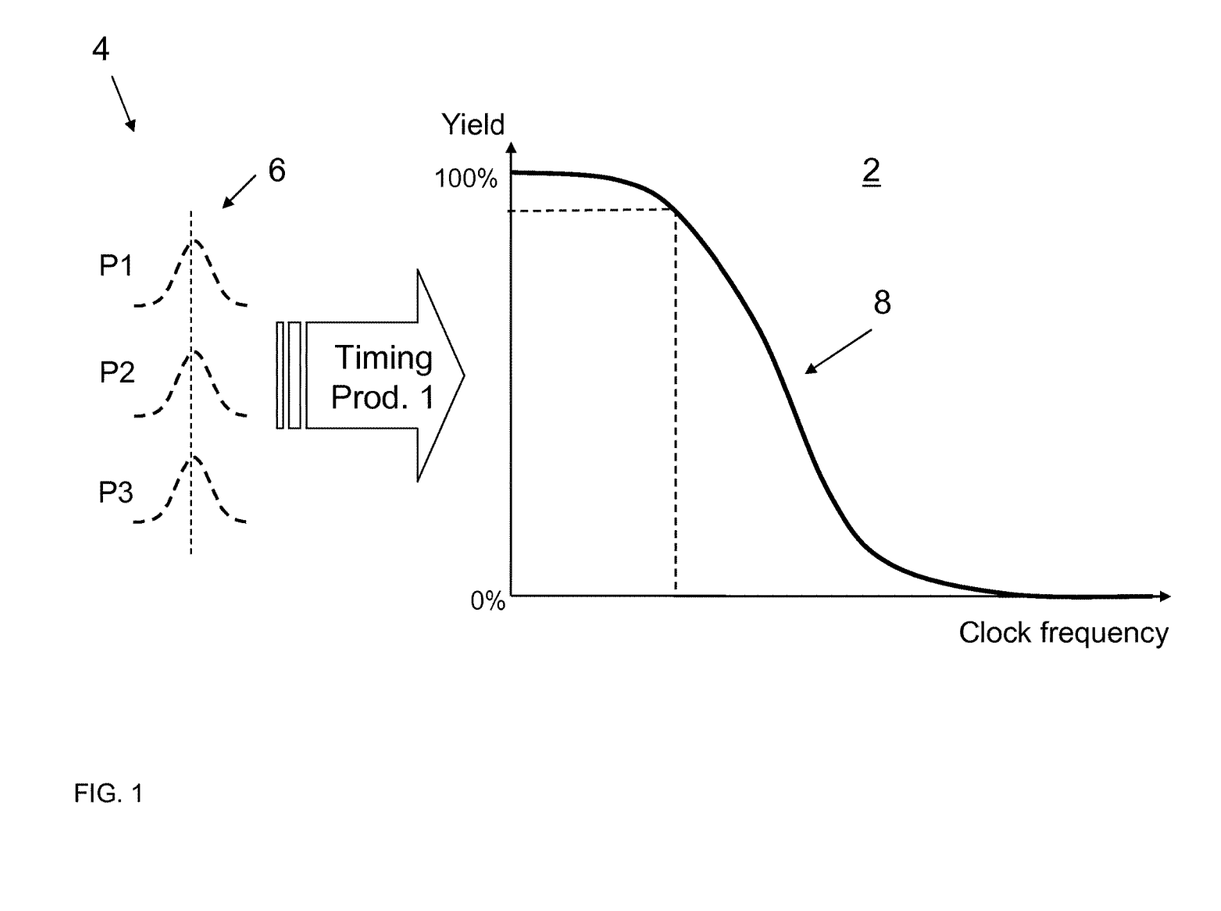
FIG. 1 shows a yield curve illustrating aspects of the invention.

Turning to FIG. 1, an example worst case yield curve graph 2 (plotting chip yield v. clock frequency) and an associated parameter plot 4 associated with a timing run on a first product (Prod. 1) are shown for illustrative purposes according to embodiments of the invention. As shown, the three distinct parameter distributions 6, including P1, P2 and P3 (of parameter plot 4) are projected as a yield curve 8 in the yield curve graph 2. As is known in the art, the yield curve 8 may help outline the yield of an integrated circuit product when accounting for the worst-case scenario in each of the parameters (e.g., parameter distribution curves P1, P2 and P3) and/or a combination of such parameters.

As is further known in the art, an integrated circuit chip will perform at its optimum level only when all of the slacks (e.g., timing buffers) have a value of zero, or are positive. That is, a negative slack indicates that a signal is traveling more slowly than a critical time between locations on the chip, while a positive slack indicates that the signal is arriving in less than the critical designed time. Where all of the slacks on the chip are either zero or positive, all of the critical timing requirements are met. This allows the chip to function as designed. Each slack within the chip has a sensitivity to one or more process parameters used in forming the chip. Where chips are manufactured in sets, or bunches, some chips may be formed at the mean of a parameter distribution, while others may deviate from the mean (e.g., by a sigma value or greater, such as a worst-case corner value) across the distribution. These parameter distributions are illustrated in the parameter distribution curves P1, P2 and P3 in FIG. 1. From these parameter distributions, it may be desirable to determine a combination of parameters that will result in a zero (or positive) slack scenario across the chip. In order to determine this combination of parameters, the parameter distributions are integrated (via conventional mathematical integration formulae) to form a yield curve, e.g., the yield curve 8 of FIG. 1. After formation of the yield curve 8, a particular desired yield is determined (e.g., 90%, 95%, etc.), and a corresponding clock frequency for that yield can be determined.

Figure 2:
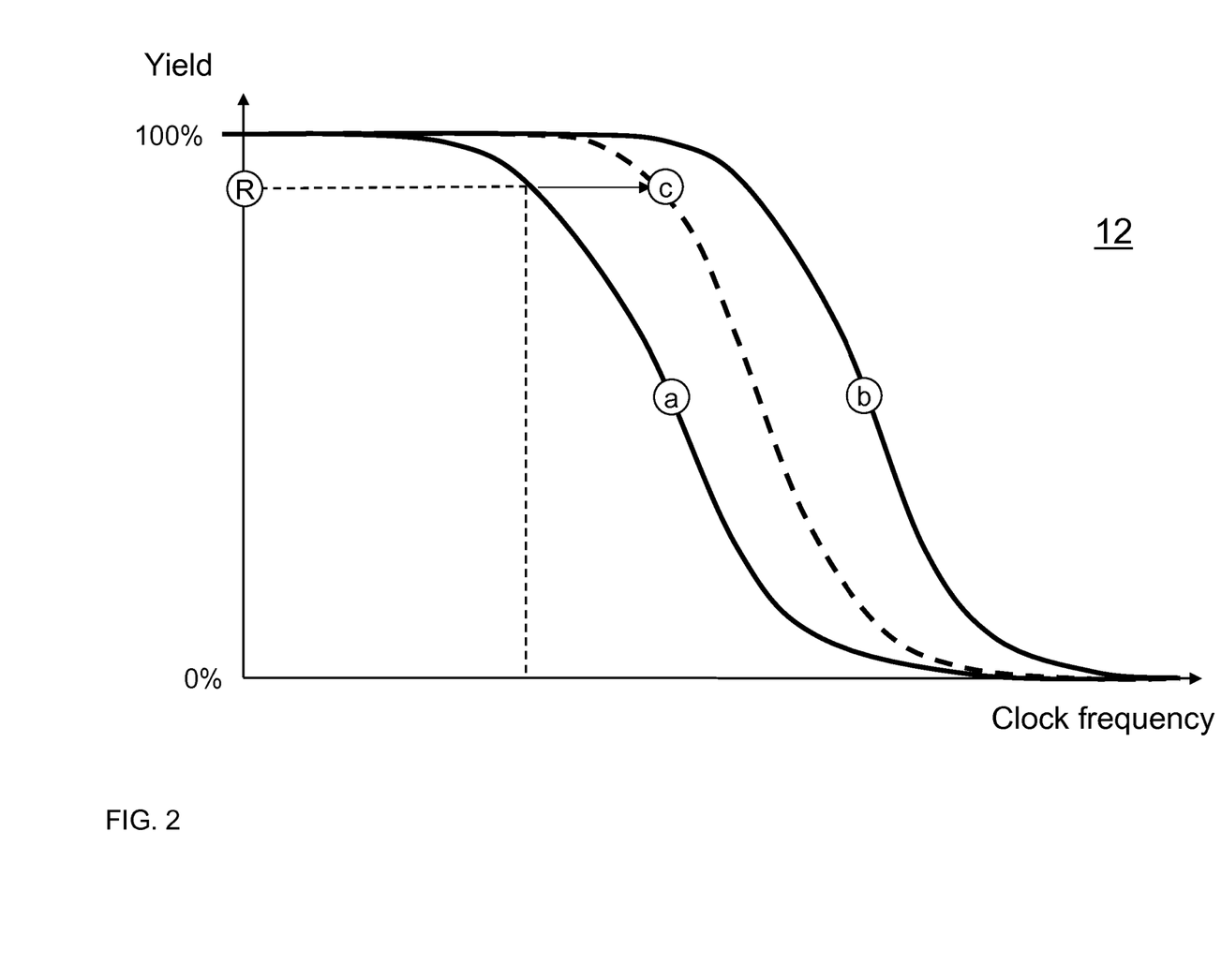
FIG. 2 shows a yield curve illustrating aspects of the invention.

FIG. 2 shows another example yield curve graph 12 (plotting yield v. clock frequency) including three distinct yield curves (a), (b) and (c). Yield curve (a) illustrates the yield of the full chip timing in the worst case scenario for the integrated circuit product, and yield curve (b) illustrates the yield curve from tested critical paths in the integrated circuit product. The predetermined required yield for this example integrated circuit product is approximately 95%, as noted at point (R). When accounting for the required yield (R), the yield curve is shifted to a location between yield curve (a) and yield curve (b), illustrated by yield curve (c). Yield curve (c) illustrates the yield when adjusted for critical features (e.g., closure corners). In this example, the clock frequency of the chip may be chosen based upon the corresponding location of the predetermined required yield along the adjusted yield curve (c).

Figure 3:
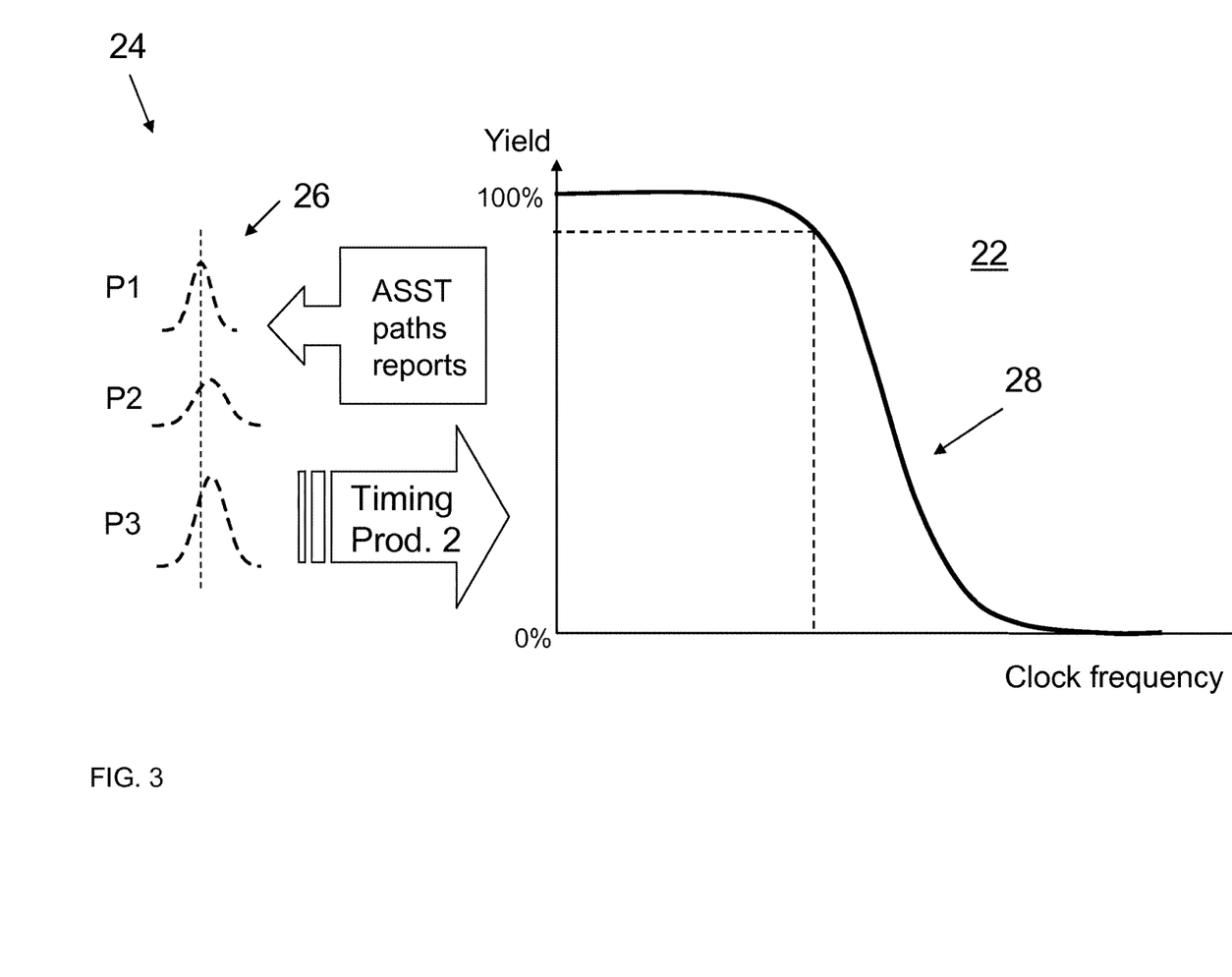
FIG. 3 shows a yield curve illustrating aspects of the invention.

FIG. 3 shows another yield curve graph 22 (plotting yield v. clock frequency) and an associated parameter plot 24 for a second (or, subsequent) product (Prod. 2) according to embodiments of the invention. The example yield curve graph 22 (and associated parameter distributions 26) reflect adjusted yields and parameter distributions based upon manufacturing feedback provided after the manufacture of a set of chips according to the yield and parameters shown in FIG. 1. The yield curve graph 22 illustrates a yield curve 28, where the worst case limits are adjusted per conventional at speed structural testing (or, ASST). As shown, the parameter distributions 26 are adjusted (when compared with parameters 6 of FIG. 1) according to the ASST feedback (ASST path reports). For example, parameter distribution P1 has a narrower "bell-curve" portion, parameter distribution P2 has a lower peak height, and parameter distribution P3 has been shifted with respect to their original positioning as parameter distributions 6 in FIG. 1. As described herein, after running the ASST, the parameter distributions for the second product (Prod. 2) can be adjusted, and the second (or, subsequent) product may be tested (e.g., via a timing analysis). Incorporating the ASST path reports into the parameter design allows the subsequent integrated circuit product (Prod. 2) to account for the manufacturing feedback identified in the ASST process. This helps to improve the yield on the subsequent (or, second) product.

It is understood that FIGS. 1-3 illustrate example processes in graphical form, and may not specifically apply to all embodiments described herein. However, FIG. 3 in particular, demonstrates how ASST feedback can be integrated into worst case limit adjustment, thereby improving the yield of a subsequently manufactured chip.

Figure 4:
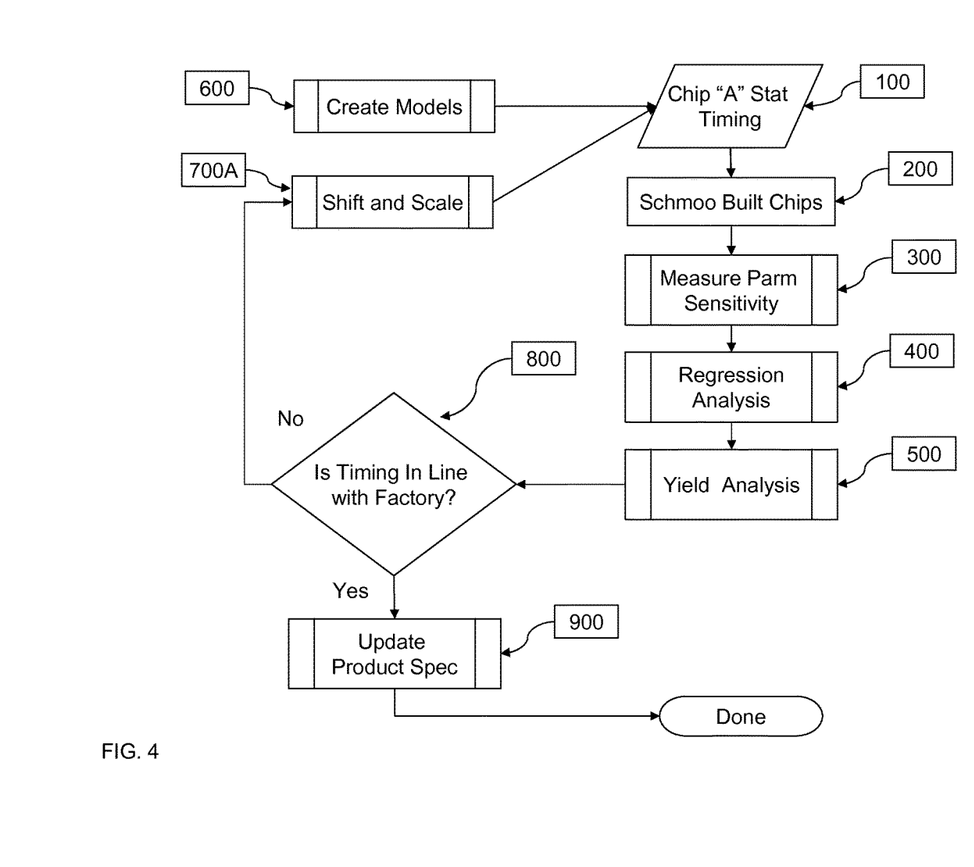
FIG. 4 shows an illustrative process flow diagram according to aspects of the invention.
Figure 5:
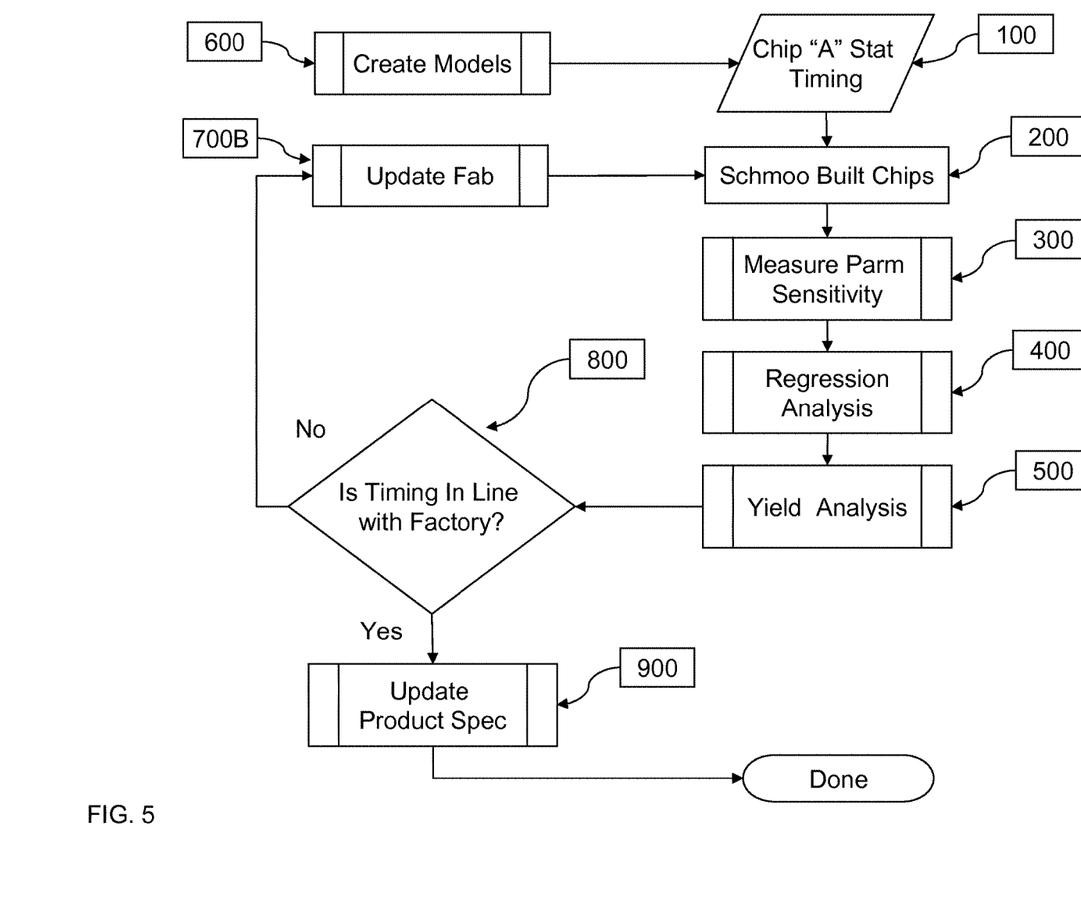
FIG. 5 shows an illustrative process flow diagram according to aspects of the invention.

In one aspect, the invention includes the following processes, as outlined in the process flow diagram depicted in FIGS. 4-5:

Process (100) Performing statistical timing closure analysis (or STAT analysis) on a first chip (chip A) using Gaussian parameter distributions and corner limits defined by the initial integrated circuit model;

Process (200) Measuring the static statistical timing analysis paths performance using a Shmoo test of each selected path within the chip;

Process (300) Testing those paths having high single-parameter sensitivity (PSRO/SPM) when compared to a predetermined sensitivity threshold, as indicated by the Shmoo test results;

Process (400) Performing a regression analysis for each chip, given the parameter values tested in process (300);

Process (500) Conducting a yield timing analysis to generate a yield curve for the IC product as a function of the parameter distributions. The yield requirement gives the limit for each parameter to deliver the desired yield. This yield requirement sets the projection corner timing for the product matching the yield;

Process (800) Determining whether the timing matches a desired capacity of the fabrication facility;

Process (900) If the timing matches the capacity of the fabrication facility, the product (integrated circuit) specifications are updated, and the process ends;

Process (700—shown alternatively as Processes 700A or 700B between FIGS. 4 and 5) If the timing does not match the desired capacity of the fabrication facility, one of two actions are taken:

Process (700A, FIG. 4) The canonical delay models may be modified by shifting and scaling the sources of variation between the timing and the capacity of the fabrication facility; this process may be followed by returning to process (100), performing a STAT analysis on the modified (shifted/scaled) model; or Process (700B, FIG. 5) The fabrication plan process is updated to match the product (integrated circuit) timing; this process may be followed by returning to process (200), measuring the static statistical timing analysis paths performance using a Shmoo test of each path within the chip.

It is understood that Process (600) shown in FIGS. 4-5 may be a preliminary process, or may be updated (concurrently) based upon modifications to the models as described with reference to Process (100)-Process (900).

In any case, as described herein, aspects of the invention may provide for solutions configured to integrate manufacturing feedback into a design of an integrated circuit product. In one exemplary embodiment, the computer-implemented method may include: defining an acceptable yield requirement for a first integrated circuit product; performing a regression analysis on data representing paths in the first integrated circuit product to define a plurality of parameter settings based upon the acceptable yield requirement; determining a projection corner associated with the parameter settings for satisfying the acceptable yield requirement; and modifying a design of a second integrated circuit product based upon the projection corner and the plurality of parameter settings.

Figure 6:
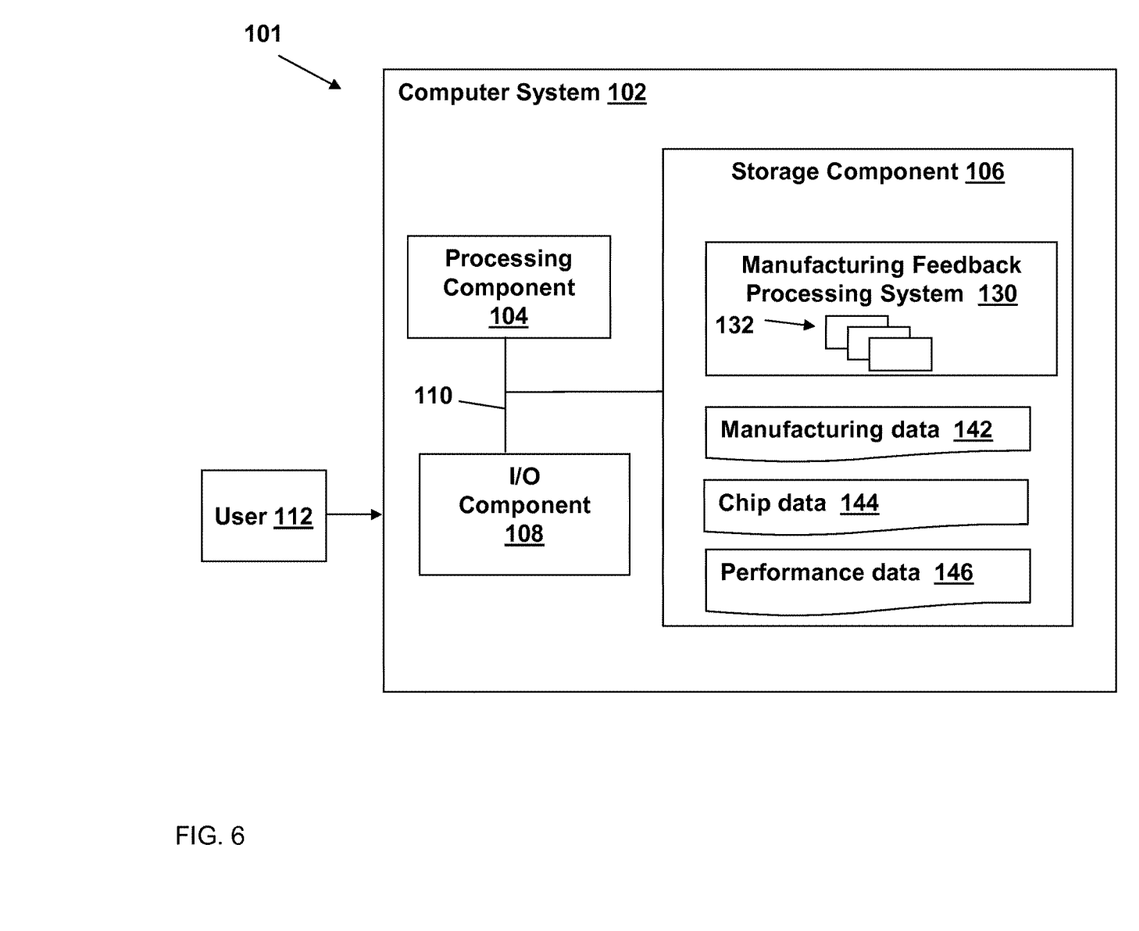
FIG. 6 shows an illustrative environment according to embodiments of the invention.

FIG. 6 depicts an illustrative environment 101 for integrating manufacturing feedback (e.g., ASST data) into an integrated circuit structure design according to an embodiment. To this extent, the environment 101 includes a computer system 102 that can perform a process described herein in order to integrate manufacturing feedback into an integrated circuit structure design. In particular, the computer system 102 is shown as including a manufacturing feedback processing system 130, which makes computer system 102 operable to handle integrating manufacturing feedback into an integrated circuit structure design by performing any/all of the processes described herein and implementing any/all of the embodiments described herein.

The computer system 102 is shown including a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the manufacturing feedback processing system 130, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a human user 112 to interact with the computer system 102 and/or one or more communications devices to enable a system user 112 to communicate with the computer system 102 using any type of communications link. To this extent, the manufacturing feedback processing system 130 can manage a set of interfaces (e.g., graphical user interface(s), application program interface, etc.) that enable human and/or system users 112 to interact with the manufacturing feedback processing system 130. Further, the manufacturing feedback processing system 130 can manage (e.g., store, retrieve, create, manipulate, organize, present, etc.) data, such as manufacturing data (e.g., ASST data) 142, chip data (e.g., chip dimensions, spacings, tolerances, etc.) 144 and/or chip performance data (e.g., IR drop requirements, voltages, timing requirements, etc.) 146, etc., using any solution.

In any event, the computer system 102 can comprise one or more general purpose computing articles of manufacture (e.g., computing devices) capable of executing program code, such as the manufacturing feedback processing system 130, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the manufacturing feedback processing system 130 can be embodied as any combination of system software and/or application software.

Further, the manufacturing feedback processing system 130 can be implemented using a set of modules 132. In this case, a module 132 can enable the computer system 102 to perform a set of tasks used by the manufacturing feedback processing system 130, and can be separately developed and/or implemented apart from other portions of the manufacturing feedback processing system 130. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of manufacturing feedback processing system 130 fixed thereon (e.g., one or more modules 132). However, it is understood that the computer system 102 and manufacturing feedback processing system 130 are only representative of various possible equivalent computer systems that may perform a process described herein. To this extent, in other embodiments, the functionality provided by the computer system 102 and manufacturing feedback processing system 130 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 102 can obtain or provide data, such as manufacturing data (e.g., ASST data) 142, chip data 144 and/or performance data 146 using any solution. For example, the computer system 102 can generate and/or be used to generate manufacturing data 142, chip data 144 and/or performance data 146, retrieve manufacturing data 142, chip data 144 and/or performance data 146, from one or more data stores, receive manufacturing data 142, chip data 144 and/or performance data 146, from another system, send manufacturing data 142, chip data 144 and/or performance data 146 to another system, etc.

While shown and described herein as a method and system for integrating manufacturing feedback into an integrated circuit design, it is understood that aspects of the invention further provide various alternative embodiments. For example, in one embodiment, the invention provides a computer program fixed in at least one computer-readable medium, which when executed, enables a computer system to determine a lithographic set point. To this extent, the computer-readable medium includes program code, such as the manufacturing feedback processing system 130 (FIG. 6), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the manufacturing feedback processing system 130 (FIG. 6), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for correcting a mask deviation. In this case, a computer system, such as the computer system 102 (FIG. 6), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

The following figures will present examples of approaches used in the estimation of process variability across a plurality of integrated circuit structures within a batch. These figures are only illustrative, and it is understood that additional and/or alternative processes may be integrated with the approaches outlined herein.

Figure 7:
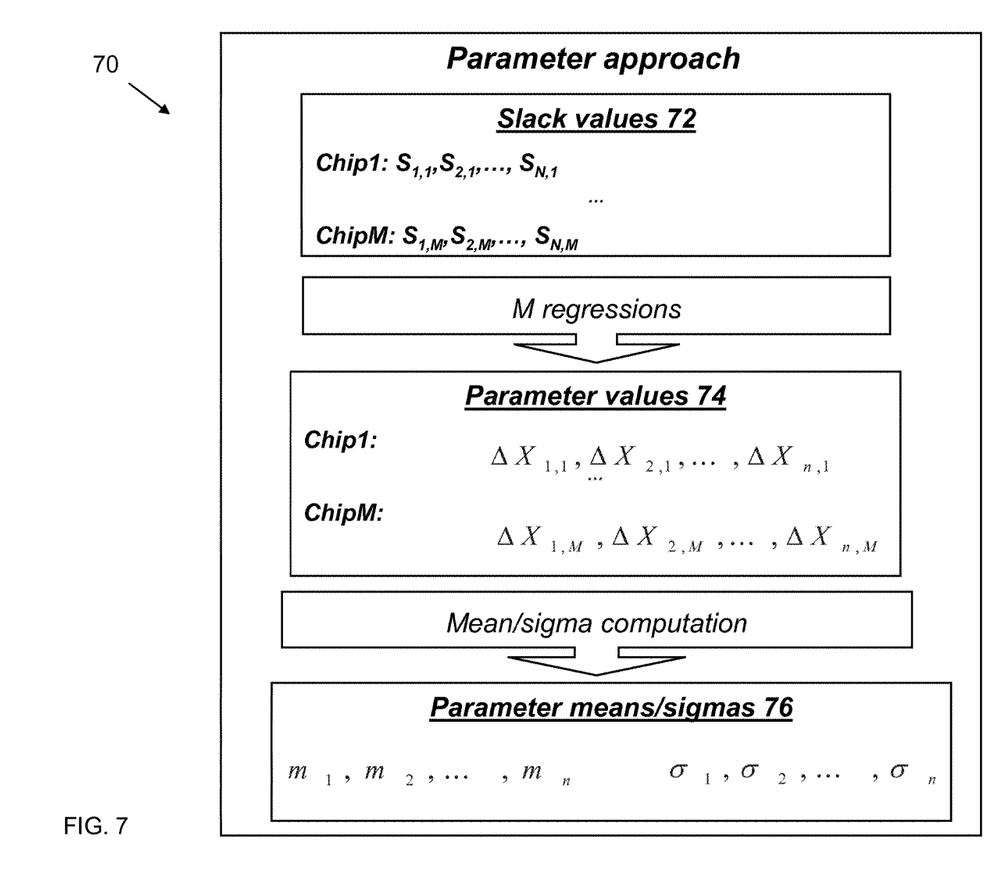
FIG. 7 shows an illustrative process flow diagram according to aspects of the invention.

FIG. 7 illustrates a schematic view of a process flow 70 according to a parameter-based approach for variability estimation. As shown, in one embodiment, a plurality of slack values 72 for each of a first chip (Chip 1) through a final (subsequent chip, Chip M) may be used in a regression analysis (M regressions) to determine a plurality of corresponding parameter values 74. The corresponding parameter values 74 may then be processed according to a mean and sigma (or mean/sigma) computation to generate parameter mean/sigma values (or parameter mean sigmas) 76.

In the parameter-based process variation estimation approach generally illustrated in FIG. 7, the following may be performed:

(P1)—For each chip measured, sample values of process parameters are estimated (e.g., using linear regression of the equations expressing slacks);

(P2)—Estimate mean values of global (chip-wide) process parameters, using samples values of process parameters computed for each chip, along with the following equation:

$$m_j = \frac{1}{M}\sum_{k=1}^{M} \Delta X_{j,k} \tag{a}$$

(P3)—Estimate the sigmas (standard deviations) of the global process parameters by using sample values of local process parameters, along with the following equation:

$$\sigma_j = \sqrt{\frac{1}{M-1}\sum_{k=1}^{M}(\Delta X_{j,k} - m_j)^2} \tag{b}$$

In order to estimate the sample values of local process parameters, the following slack equations can be utilized for a single chip number (k):

$$s_{1,0} + a_{1,1}\Delta X_{1,k} + a_{1,2}\Delta X_{2,k} + \ldots + a_{1,n}\Delta X_{n,k} + \Delta R_{1,k} = S_{1,k} \tag{c}$$

$$s_{2,0} + a_{2,1}\Delta X_{1,k} + a_{2,2}\Delta X_{2,k} + \ldots + a_{2,n}\Delta X_{n,k} + a_{2,R}\Delta R_{2,k} = S_{2,k}$$

$$\ldots$$

$$s_{N,0} + a_{N,1}\Delta X_{1,k} + a_{N,2}\Delta X_{2,k} + \ldots + a_{N,n}\Delta X_{n,k} + \alpha_{N,R}\Delta R_{N,k} = S_{N,k}$$

Where the following quantities are unknown:
(i) $\Delta X_{1,k}, \Delta X_{2,k}, \ldots, \Delta X_{n,k}$-parameters to estimate; and
(ii) $\Delta R_{1,k}, \Delta R_{2,k}, \ldots, \Delta R_{N,k}$-errors of the regression analysis.

In order to determine these unknown quantities (i) and (ii), linear regression analysis may be performed, however, because the errors are paired with the $a_{i,R}$ coefficients, the slack equations can be normalized to account for this coefficient, transforming the slack equations to the following:

$$(a_{1,1}/a_{1,R})\Delta X_{1,k} + (a_{1,2}/a_{1,R})\Delta X_{2,k} + \ldots + (a_{1,n}/a_{1,R})\Delta X_{n,k} + \Delta R_{1,k} = \tag{c_T}$$

$$(S_{1,k} - s_{1,0})/a_{1,R}$$

$$(a_{2,1}/a_{2,R})\Delta X_{1,k} + (a_{2,2}/a_{2,R})\Delta X_{2,k} + \ldots + (a_{2,n}/a_{2,R})\Delta X_{n,k} + \Delta R_{2,k} =$$

$$(S_{2,k} - s_{2,0})/a_{2,R}$$

$$\ldots$$

$$(a_{N,1}/a_{N,R})\Delta X_{1,k} + (a_{N,2}/a_{N,R})\Delta X_{2,k} + \ldots +$$

$$(a_{N,n}/a_{N,R})\Delta X_{n,k} + \Delta R_{N,k} = (S_{N,k} - s_{N,0})/a_{N,R}$$

Figure 8:
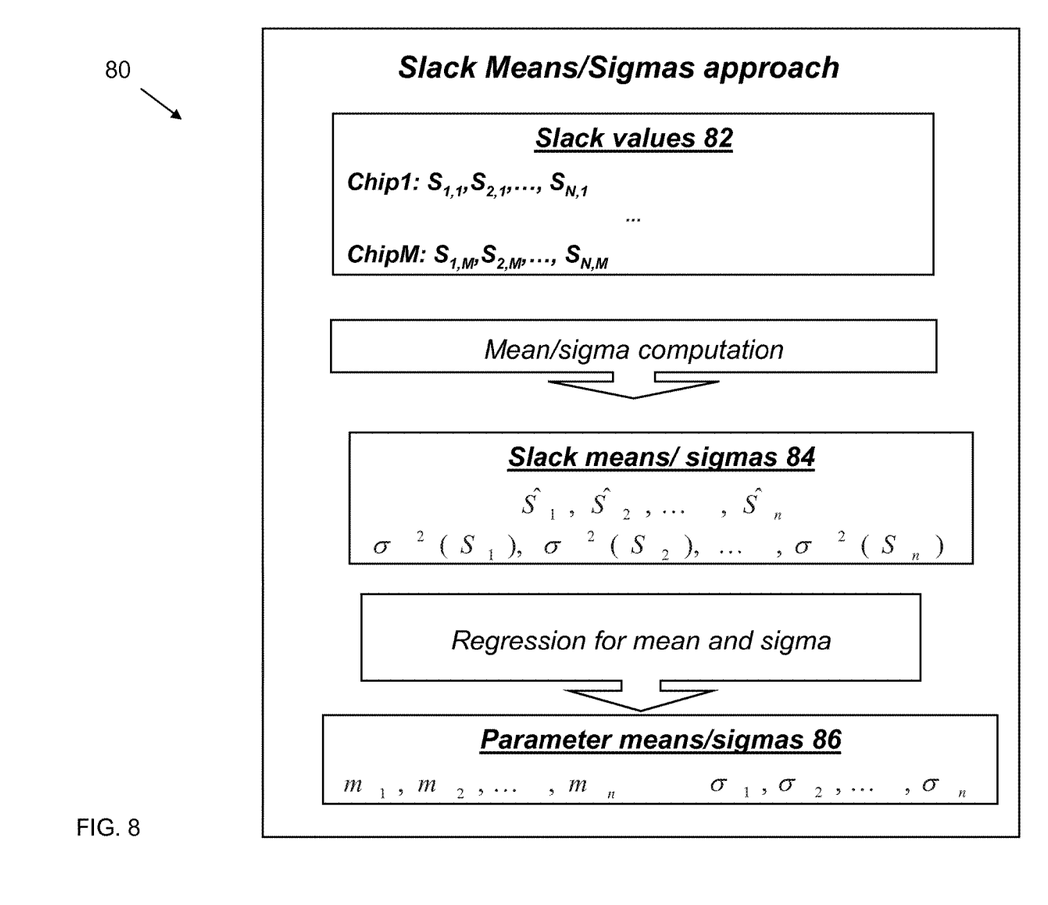
FIG. 8 shows an illustrative process flow diagram according to aspects of the invention.

FIG. 8 illustrates a schematic view of an alternative process flow 80 according to a slack means/sigmas-based approach for variability estimation. As shown, in one embodiment, a plurality of slack values 82 for each of a first chip (Chip 1) through a final (subsequent chip, Chip M) may be used in a mean/sigma computation to determine a plurality of corresponding slack means/sigma values 84. The slack means/sigma values 84 may then be processed according to a regression analysis tailored for means and sigmas to generate parameter mean/sigma values (or parameter mean sigmas) 86.

In the slack means/sigma values approach generally illustrated in FIG. 8, the following may be performed:

(P1)—For each timing slack ($S_i$) measured, estimate the slack mean and sigma using M samples $S_{i,k}$ of the slack, where the slacks of each PSRO (path) have a Gaussian distribution; This estimation may be performed using the following formulas:

$$\hat{S}_i = \frac{1}{M} \sum_{i=1}^{M} \Delta S_{i,k} \quad (a)$$

$$\sigma^2(S_i) = \frac{1}{M-1} \sum_{k=1}^{M} (\Delta S_{i,k} - \hat{S}_i)^2; \quad (b)$$

(P2)—Use a regression technique for estimating the mean values of global process parameters, where the regression equations are derived by taking expected values from both sides of the slack equation; and (P3)—Using a regression technique for estimating variances (sigma-squared) of the global process parameters, where the regression equations are derived by computing the variances on both sides of the slack equations. This regression analysis may be aided by knowledge that all global and uncorrelated parameters are independent.

The following slack equations can be used according to the processes noted above:

$$s_{1,0} + a_{1,1}\Delta X_1 + a_{1,2}\Delta X_2 + \ldots + a_{1,n}\Delta X_n + a_{1,R}\Delta R_1 = S_1 \quad (c)$$

$$s_{2,0} + a_{2,1}\Delta X_1 + a_{2,2}\Delta X_2 + \ldots + a_{2,n}\Delta X_n + a_{2,R}\Delta R_2 = S_2$$

$$\ldots$$

$$s_{N,0} + a_{N,1}\Delta X_1 + a_{N,2}\Delta X_2 + \ldots + a_{N,2}\Delta X_n + a_{N_2 R}\Delta R_N = S_N$$

The mean values may be computed from both sides of the equation, respectively:

$$a_{1,1}m_1 + a_{1,2}m_2 + \ldots + a_{1,n}m_n + a_{1,R}\Delta\hat{R}_1 = \hat{S}_1 - s_{1,0} \quad (d)$$

$$a_{2,1}m_1 + a_{2,2}m_2 + \ldots + a_{2,n}m_n + a_{2,R}\Delta\hat{R}_2 = \hat{S}_2 - s_{2,0}$$

$$\ldots$$

$$a_{N,1}m_1 + a_{N,2}m_2 + \ldots + a_{N,n}m_n + a_{N,R}\Delta\hat{R}_N = \hat{S}_N - s_{N,0}$$

The corresponding normalizing equations with $a_{i,R}$ may include:

$$(a_{1,1}/a_{1,R})m_1 + (a_{1,2}/a_{1,R})m_2 + \ldots + (a_{1,n}/a_{1,R})m_n + \Delta\hat{R}_1 = \quad (e)$$

$$(\hat{S}_1 - s_{1,0})/a_{1,R}$$

$$(a_{2,1}/a_{2,R})m_1 + (a_{2,2}/a_{2,R})m_2 + \ldots + (a_{2,n}/a_{2,R})m_n + \Delta\hat{R}_2 =$$

$$(\hat{S}_2 - s_{2,0})/a_{2,R}$$

$$\ldots$$

$$(a_{N,1}/a_{N,R})m_{1m} + (a_{N,2}/a_{N,R})m_2 + \ldots + (a_{N,n}/a_{N,R})m_n + \Delta\hat{R}_N =$$

$$(S_n - s_{N,0})/a_{N,R}$$

The variance from both sides of the slack equations may be computed using the following:

$$a_{1,1}^2\sigma_1^2 + a_{1,2}^2\sigma_2^2 + \ldots + a_{1,n}^2\sigma_n^2 + a_{1,R}^2 \cdot \sigma^2(\Delta R_1) = \sigma^2(S_1) \quad (f)$$

$$a_{2,1}^2\sigma_1^2 + a_{2,2}^2\sigma_2^2 + \ldots + a_{2,n}^2\sigma_n^2 + a_{2,R}^2 \cdot \sigma^2(\Delta R_2) = \sigma^2(S_2)$$

$$\ldots$$

$$a_{N,1}^2\sigma_1^2 + a_2^2 + \ldots + a_{N,n}^2\sigma_n^2 + a_{N,R}^2 \cdot \sigma^2(\Delta R_N) = \sigma^2(S_N)$$

The corresponding normalizing equations for the variance (sigma-squared) circumstance ($a_{i,R}$) may be computed using the following:

$$(a_{1,1}^2/a_{1,R}^2)\sigma_1^2 + (a_{1,2}^2/a_{1,R}^2)\sigma_2^2 + \quad (g)$$

$$\ldots + (a_{1,n}^2/a_{1,R}^2)\sigma_n^2 + \sigma^2(\Delta R_1) = \sigma^2(S_1)$$

$$(a_{2,1}^2/a_{2,R}^2)\sigma_1^2 + (a_{2,2}^2/a_{2,R}^2)\sigma_2^2 + \ldots + (a_{2,n}^2/a_{2,R}^2) + \sigma_n^2 + \sigma^2(\Delta R_2) =$$

$$\sigma^2(S_2)$$

$$\ldots$$

$$(a_{N,1}^2/a_{N,R}^2)\sigma_1^2 + (a_{N,2}^2/a_{N,R}^2)\sigma_2^2 +$$

$$\ldots + (a_{N,n}^2/a_{N,R}^2)\sigma_n^2 + \sigma^2(\Delta R_N) = \sigma^2(S_N)$$

The sigmas ($\sigma$, $\sigma$, ..., $\sigma_n$) may then be computed by regression, where $\sigma^2(\Delta R_1)$, $\sigma^2(\Delta R_2)$, ..., $\sigma^2(\Delta R_n)$ are regression residues. These values can be used in estimating parameters of uncorrelated variations.

Figure 9:
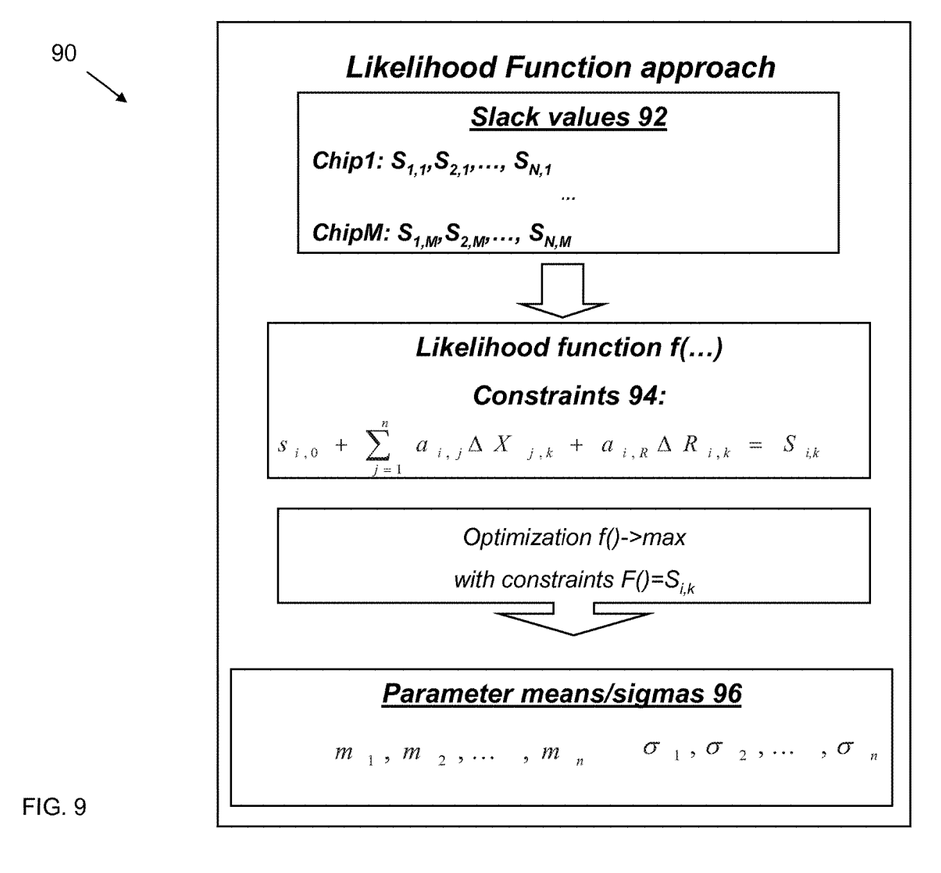
FIG. 9 shows an illustrative process flow diagram according to aspects of the invention.

FIG. 9 illustrates a schematic view of an alternative process flow 90 according to a slack means/sigmas-based approach for variability estimation. As shown, in one embodiment, a plurality of slack values 92 for each of a first chip (Chip 1) through a final (subsequent chip, Chip M) may be processed according to likelihood function constraints 94, and subsequently optimized using those constraints, to generate parameter mean/sigma values (or parameter mean sigmas) 96.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
at least one computing device configured to integrate manufacturing feedback into an integrated circuit design by performing actions including:
defining an acceptable yield requirement for a first integrated circuit product;
obtaining manufacturing data about the first integrated circuit product,
wherein the obtaining of the manufacturing data includes performing a timing measurement on all logical paths in the first integrated circuit product;
performing a regression analysis on data representing the logical paths in the first integrated circuit product to define a plurality of parameter settings based upon the acceptable yield requirement and the manufacturing data,
wherein each of the plurality of parameter settings includes a parameter distribution having a bell curve;
determining a projection corner associated with the parameter settings for satisfying the acceptable yield requirement,
wherein the determining of the projection corner includes generating a yield curve for the first integrated circuit product as a function of a distribution of the timing measurement for all of the logical paths in the first integrated circuit product;
modifying a design of a second integrated circuit product based upon the projection corner and the plurality of parameter settings,
wherein the modifying the design of the second integrated circuit product includes adjusting each of the bell curves of the plurality of parameter settings,
wherein adjusting each of the bell curves includes separate adjusting at least one of a width of the bell curve, a height of a peak of the bell curve, or a lateral position of the peak of the bell curve;
generating a second yield curve representing the design of the second integrated circuit product such that the second yield curve accounts for each of the adjusted bell curves;
performing a statistical timing closure of the modified design of the second integrated circuit product after the adjusting of each of the bell curves,
wherein the projection corner is a worst case corner that provides the slowest path delay between two nodes in a circuit path; and
manufacturing a physical chip in accuracy according to the design of the second integrated circuit product.

2. The system of claim 1, wherein the acceptable yield requirement is based upon predetermined design yield.

3. The system of claim 1, wherein the at least one computing device is further configured to provide the design of the second integrated circuit product.

4. The system of claim 1, wherein the regression analysis includes at least one of: a parameter based analysis, a slack means and sigmas based analysis or a likelihood function analysis.

5. The system of claim 4, wherein the regression analysis includes estimating sample values of the parameter settings prior to defining the plurality of parameter settings in the parameter based analysis.

6. The system of claim 1, wherein the second integrated circuit product is formed subsequently to the first integrated circuit product.

7. The system of claim 1, wherein the yield curve is adjusted for critical features by shifting the yield curve between a full chip timing yield of the first integrated circuit product in the worst corner scenario and a critical path yield of the first integrated circuit product.

8. The system of claim 1, wherein the source of variation of the first integrated circuit product is a worst case parameter.

9. A computer program product comprising program code embodied in at least one non-transitory computer-readable medium, which when executed, enables a computer system to integrate manufacturing feedback into an integrated circuit design by performing actions comprising:
defining an acceptable yield requirement for a first integrated circuit product;
obtaining manufacturing data about the first integrated circuit product,
wherein the obtaining of the manufacturing data includes performing a timing measurement on all logical paths in the first integrated circuit product;
performing a regression analysis on data representing the logical paths in the first integrated circuit product to define a plurality of parameter settings based upon the acceptable yield requirement and the manufacturing data,
wherein each of the plurality of parameter settings includes a parameter distribution having a bell curve;
determining a projection corner associated with the parameter settings for satisfying the acceptable yield requirement,
wherein the determining of the projection corner includes generating a yield curve for the first integrated circuit product as a function of a distribution of the timing measurement for all of the logical paths in the first integrated circuit product;
modifying a design of a second integrated circuit product based upon the projection corner and the plurality of parameter settings,
wherein the modifying the design of the second integrated circuit product includes adjusting each of the bell curves of the plurality of parameter settings,
wherein adjusting each of the bell curves includes separate adjusting at least one of a width of the bell curve, a height of a peak of the bell curve, or a lateral position of the peak of the bell curve;
generating a second yield curve representing the design of the second integrated circuit product such that the second yield curve accounts for each of the adjusted bell curves;
performing an at speed structural test on the modified design of the second integrated circuit product after adjusting each of the bell curves; and
wherein the projection corner is a worst case corner that provides the slowest path delay between two nodes in a circuit path; and manufacturing a physical chip in accuracy according to the design of the second integrated circuit product.

10. The computer program of claim 9, wherein the acceptable yield requirement is based upon predetermined design yield.

11. The computer program of claim 9, wherein the regression analysis includes at least one of: a parameter based analysis, a slack means and sigmas based analysis or a likelihood function analysis.

12. The computer program of claim 11, wherein the regression analysis includes estimating sample values of the parameter settings prior to defining the plurality of parameter settings in the parameter based analysis.

13. The computer program product of claim 9, wherein the second integrated circuit product is formed subsequently to the first integrated circuit product.

14. The computer program product of claim 9, wherein the yield curve is adjusted for critical features by shifting the yield curve between a full chip timing yield of the first integrated circuit product in a worst corner scenario and a critical path yield of the first integrated circuit product.

* * * * *